(12) United States Patent
Allaart et al.

(10) Patent No.: US 7,014,409 B2
(45) Date of Patent: Mar. 21, 2006

(54) FASTENING ELEMENT

(75) Inventors: Jan Allaart, Mauren (LI); Sven Dietze, Feldkirch (AT); Thorsten Ebert, Hergensweiler (DE)

(73) Assignee: Hilti Aktiengesellschaft, Schaan (LI)

( * ) Notice: Subject to any disclaimer, the term of this patent is extended or adjusted under 35 U.S.C. 154(b) by 30 days.

(21) Appl. No.: 10/874,487

(22) Filed: Jun. 23, 2004

(65) Prior Publication Data

US 2005/0008452 A1 Jan. 13, 2005

(30) Foreign Application Priority Data

Jun. 24, 2003 (DE) ................................ 103 28 197

(51) Int. Cl.
  *F16B 15/00* (2006.01)
(52) U.S. Cl. ........................ 411/487; 411/914; 411/901; 411/902; 411/440
(58) Field of Classification Search ................ 411/487, 411/490, 901, 902, 498, 499, 440, 493, 41, 411/914, 411, 386, 387.1
See application file for complete search history.

(56) References Cited

U.S. PATENT DOCUMENTS

| 1,829,974 | A | * | 11/1931 | Williams | 411/439 |
| 2,203,294 | A | * | 6/1940 | Engle | 411/487 |
| 2,751,808 | A | * | 6/1956 | MacDonald et al. | 411/493 |
| 3,218,136 | A | * | 11/1965 | Hogan et al. | 411/498 |
| 3,320,845 | A | * | 5/1967 | Eschweiler | 411/441 |
| 3,858,478 | A | * | 1/1975 | Boudreau, Jr. | 411/533 |
| 3,921,495 | A | * | 11/1975 | Braun et al. | 411/441 |
| 4,802,802 | A | * | 2/1989 | Thurner | 411/107 |

(Continued)

FOREIGN PATENT DOCUMENTS

GB 2150054 A * 6/1985

OTHER PUBLICATIONS www.dictionary.reference.com definition: 'austenite' NPL.*

(Continued)

*Primary Examiner*—Robert J. Sandy
*Assistant Examiner*—Jeffrey A. Sharp
(74) *Attorney, Agent, or Firm*—Abelman, Frayne & Schwab

(57) ABSTRACT

A fastening element which has a core (16) of a relatively hard, carburized steel and a ferritic rim zone (15) of a less hard, low-carbon steel, includes a stem (11), a head (14) provided at one end of the stem (11), a tip (13) provided at an opposite end of the stem (11), and a transition region (12) extending between the stem (11) and the tip (13) and in which a thickness (18, 19, 20) of the ferritic rim zone (15) gradually diminishes from the stem (11) in a direction toward the tip (13) to a nill value (21), so that the tip (13) is free from the ferritic rim zone (15).

7 Claims, 3 Drawing Sheets

U.S. PATENT DOCUMENTS

| | | | | |
|---|---|---|---|---|
| 4,915,561 A | * | 4/1990 | Buhri et al. | 411/439 |
| 4,927,309 A | * | 5/1990 | Sygnator | 411/439 |
| 5,261,770 A | * | 11/1993 | Hoepker et al. | 411/441 |
| 5,286,153 A | * | 2/1994 | Sartor et al. | 411/441 |
| 5,620,288 A | * | 4/1997 | Janssen et al. | 411/441 |
| 5,658,109 A | * | 8/1997 | Van Allman et al. | 411/440 |
| 5,730,570 A | * | 3/1998 | Buhofer et al. | 411/441 |
| 5,851,153 A | * | 12/1998 | Van Allman et al. | 470/40 |
| 6,162,002 A | * | 12/2000 | Rohrmoser et al. | 411/441 |
| 6,171,042 B1 | * | 1/2001 | Olvera et al. | 411/441 |
| 6,805,525 B1 | * | 10/2004 | Oswald | 411/499 |
| 6,851,906 B1 | * | 2/2005 | Gassmann et al. | 411/440 |
| 2004/0001746 A1 | * | 1/2004 | Gassmann et al. | 411/440 |

OTHER PUBLICATIONS www.efunda.com unit conversions NPL.*
www.tf.uni-keil.de "Names and Steel" NPL.*
www.scielo.br "Materials Research" NPL.*
www.key-to-steel.com "The Tempering of Martensite: Part 1 and Part 2" NPL.*

* cited by examiner

FASTENING ELEMENT

BACKGROUND OF THE INVENTION

1. Field of the Invention

The present invention relates to a fastening element having a core of a relatively hard carburized steel and a ferritic rim zone of a less hard, low-carbon steel and including a stem, a head provided at one end of the stem, and a tip provided at an opposite end of the stem.

2. Description of the Prior Art

Fastening elements of the type described above, such as nails, bolts and the like and which are made of steel, are used for attaching or fastening objects to hard materials such as concrete, metal, stone and the like. The fastening elements have a stem provided at its end, which faces in the setting direction, with a tip, and at its opposite end with a head having a diameter greater than that of the stem. The driving-in process is effected by applying blows to the head or by driving the fastening element in with a combustion energy-actuated setting tool.

German Publication DE 4139 653A1 discloses a fastening element, a nail, having a head and a stem provided at its end remote from the head with a tip. Whereas the head is formed of a deformable steel, the stem is formed of steel having a high mechanical rigidity and is deformable only over a limited circumference.

U.S. Pat. No. 5,851,153 discloses a steel pin having a ferritic outer zone extending coaxially with respect to an inner martensitic zone.

A drawback of fastening elements of the types described above and which have a relatively soft ferritic outer zone consists in a possibility that the tip would bend-up, become kinked upon striking an added material (e.g., pebbles) in concrete. As a result, a holding force of a fastening element is reduced.

Accordingly, an object of the present invention is to provide a fastening element in which the drawbacks of conventional fastening elements are eliminated.

Another object of the present invention is to provide a fastening element having a high holding force even in a non-uniformly hard material such as, e.g., concrete.

SUMMARY OF THE INVENTION

These and other objects of the present invention, which will become apparent hereinafter, are achieved by providing a transition region extending between the stem and the tip and in which a thickness of the ferritic rim zone gradually diminishes from the stem in a direction toward the tip to a nill value so that the tip is free from the ferritic rim zone.

The provision of a fastening element with a transition zone between the stem and the tip and the thickness or the radius of the ferritic rim zone of which is gradually reduced, and with a tip formed of a relatively hard material, permitted to provide a fastening element having a high holding value in a hard constructional component formed, e.g., of concrete, even in the case when the fastening element strikes a pebble or a steel material.

Advantageously, the diameter of the transition region gradually tapers toward the tip, so that the transition region becomes, from a manufacturing point of view, a part of the tip. Thereby, the transition region is formed simultaneously with the tip, which reduces manufacturing costs.

Advantageously, the rim zone has, in the region of the stem, a thickness of from 20 to 200 $\mu$m, preferably, from 40 to 100 $\mu$m. This permits to optimally reduce the brittleness of the fastening element in its stem region. As a result of reduced brittleness, no fissures are formed in the region of the stem. Advantageously, the rim zone has a hardness from 150 to 500 HV, preferably from 200 to 300 HV, which further reduces the danger of formation of fissure.

Preferably, the core has a hardness from 550 to 700 HV. This insures that the fastening element according to the invention has good drive-in characteristic and a dimensional stability, in particular, when being driven in a hard material, such as steel and concrete.

The novel features of the present invention, which are considered as characteristic for the invention, are set forth in the appended claims. The invention itself, however both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
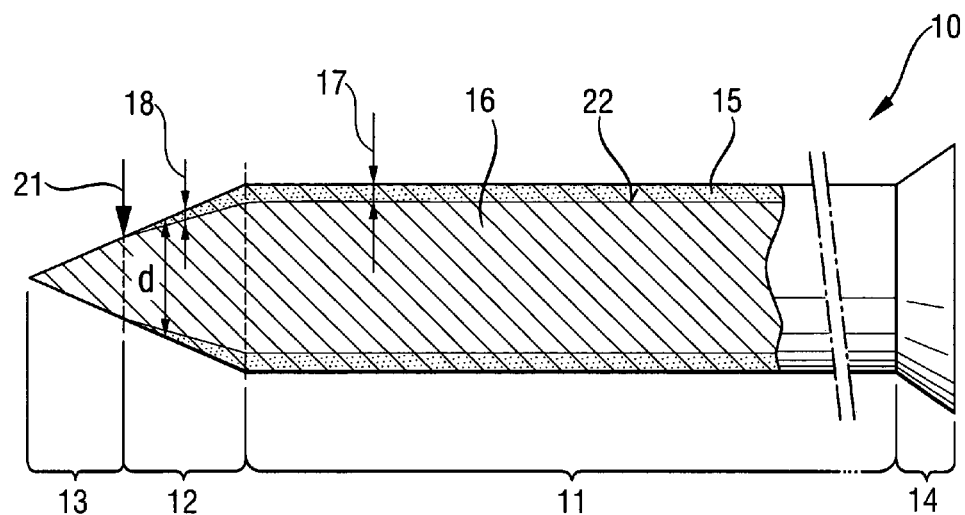
FIG. 1 a cross-sectional view of a first embodiment of a fastening element according to the present invention.
Figure 4:
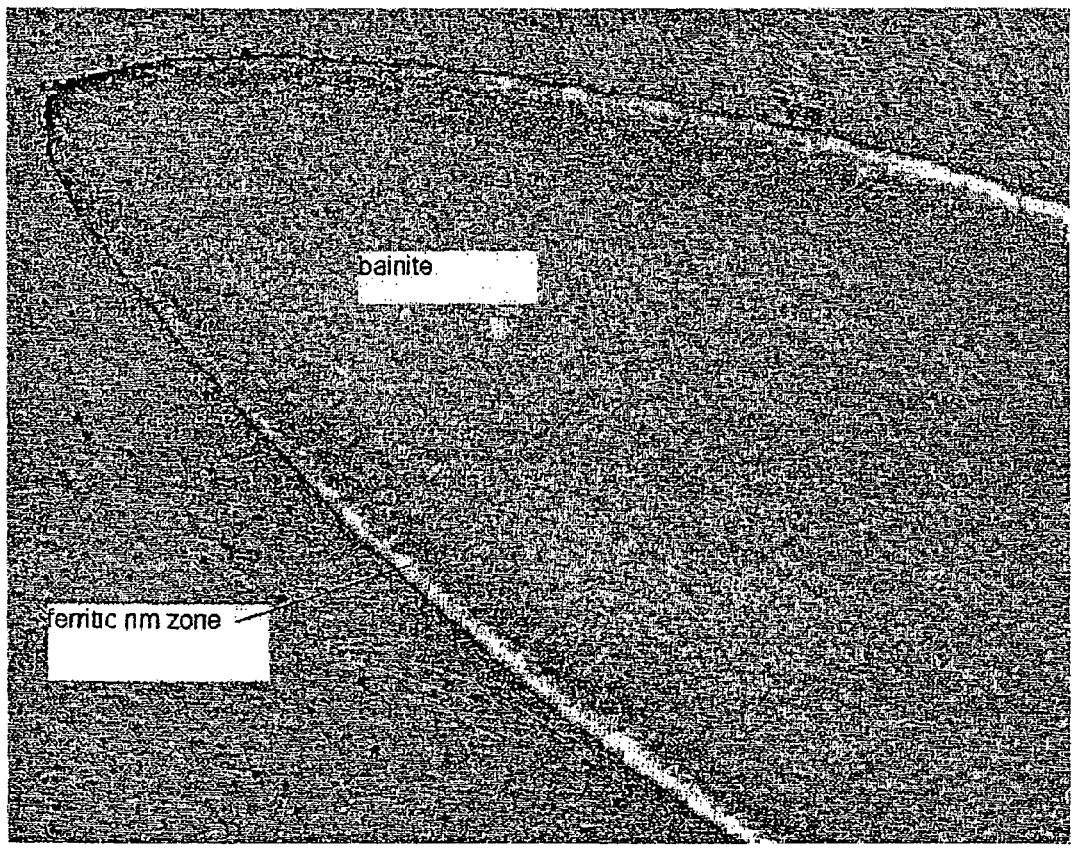
FIG. 4 a view showing a smooth transition between a ferritic rim zone and a bainitic core.

A fastening element 10 according to the present invention, which is shown in FIG. 1, is formed as a nail. The fastening element 10 has a head 14 and a stem 11 that adjoins the head 14. At its end remote from the head 14, the stem 11 has a tip 13. The fastening element 10 has a rim zone 15 extending over the stem 11 and a transition region 12 from the stem 11 to the tip 13. The rim zone 15 consists of ferritic decarburized steel having a Vickers hardness from 200 to 300 HV. However, the steel in the rim zone 15 can also have a hardness from 150 to 500 HV. The rim zone 15 is located outside of a core 16 that consists of bainitic or martensitic steel having a hardness of about from 550 to 700 HV. The thickness of the rim zone 15 in the region of the stem 11 amounts to about from 40 to 100 $\mu$m. However, this thickness can lie in a range from 20 to 200 rim. In the transition region 12, the thickness of the rim zone 15 is continuously reduced from a thickness 17 in the region of the stem 11 toward the tip 13. The thickness of the rim zone 15 in the transition region 12 is reduced substantially linearly. Approximately in the middle of the transition region 12, the thickness 18 amounts to about half of the thickness 17 of the stem 11. The rim zone 15 ends at the end of the transition region 12 adjacent to the tip 13. The position of the end of the rim zone 15 is shown with arrow 21. The tip 13 does not have a rim zone 15 and consists of a relatively hard steel of the core 16. The transition 22 from the rim zone 15 to the core 16, which is made of a hard material, e.g., a bainitic steel, can be smooth, as shown in FIG. 4, or sharp, as shown in FIG. 1. The diameter "d" of the fastening element 10 already diminishes in the transition region 12 so that geometrically, the transition region 12 can be aligned with the tip 13.

Figure 2:
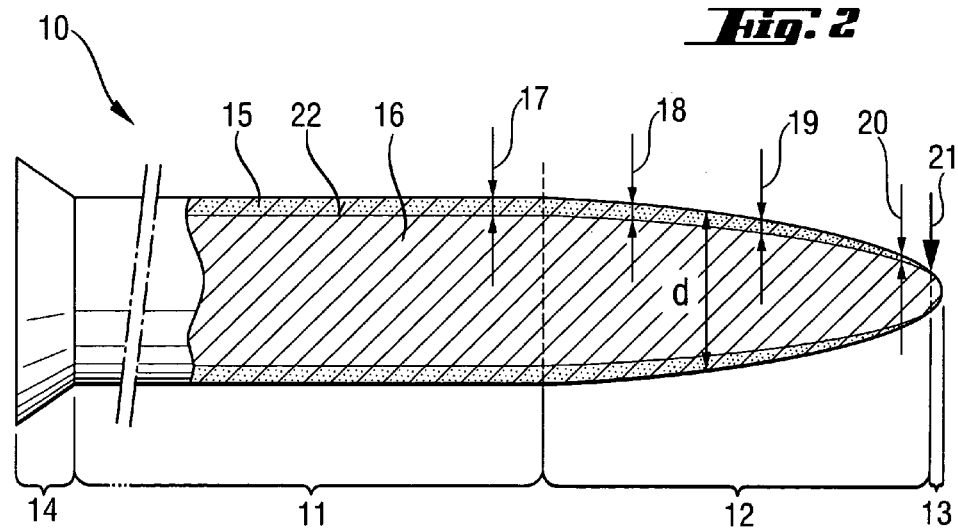
FIG. 2 a cross-sectional view of a second embodiment of a fastening element according to the present invention.
Figure 3:
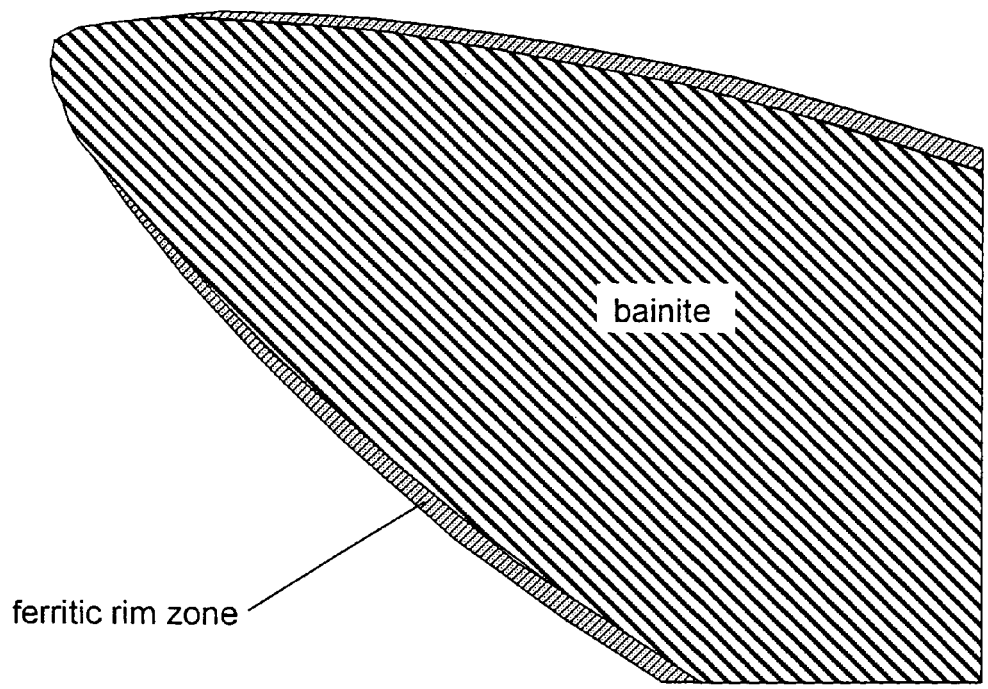
FIG. 3 a view showing a sharp transition between the ferritic rim zone and a bainitic core.

A fastening element 10 according to the second embodiment, which is shown in FIG. 2, differs from that shown in FIG. 1 in that the transition region 12 is very long in comparison with the length of rim zone-free tip 13, and in that the reduction of thicknesses, 18, 19, 20 of the rim zone 15 is not linear along the entire transition region 12. Thus, the reduction of thickness between points 19 and 20 is more pronounced than between points 18 and 19. In addition, the length of the rim zone-free tip 13 of the fastening element 10 according to the second embodiment is smaller than the length of the tip 13 of the fastening element 10 according to the first embodiment.

The reduction of the thickness of the rim zone 15 in both embodiment (FIGS. 1–2) is congruent with the reduction of the diameter "d" of the fastening element 10 in the transition region 12.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A fastening element having a core (16) of a relatively hard, carbonized steel and a ferritic rim zone (15) of a less hard, low-carbon steel which circumferentially surrounds the core (16), said fastening element comprising: a stem (11); a head (14) provided at one end of the stem (11); a tip (13) provided at an opposite end of the stem (11); and a transition region (12) extending between the stem (11) and the tip (13); the ferritic rim zone (15) extending at a substantially constant thickness along the stem (11) from the head (14) to the transition region (12); and in the transition region, the thickness (18, 19, 20) of the ferritic rim zone (15) gradually diminishes from the stem (11) in a direction toward the tip (13) to a nill value (21), whereby the tip (13) is free from the ferritic rim zone (15).

2. A fastening element according to claim 1 wherein a diameter of the transition region (12) diminishes toward the tip (13).

3. A fastening element according to claim 1, wherein the rim zone (15) has a thickness (17) from 20 to 200 $\mu$m in a region of the stem (11).

4. A fastening element according to claim 3, wherein the thickness (17) in the region of the stem (11) amounts from 40 to 100 $\mu$m.

5. A fastening element according to claim 1, wherein the core (16) has a hardness from 550 to 700 HV.

6. A fastening element according to claim 1, wherein the rim zone (15) has a hardness from 150 to 500 HV.

7. A fastening element according to claim 6, wherein the hardness of the rim zone (15) amounts to from 200 to 300 HV.

\* \* \* \* \*